May 27, 1969

R. L. OVERSTREET, JR

PULSE TRAIN REPETITION RATE DIVIDER THAT DIVIDES BY A FRACTIONAL NUMBER

Filed Nov. 30, 1965

3,446,947

INVENTOR
R. L. OVERSTREET, JR.
BY [signature]
ATTORNEY

3,446,947
PULSE TRAIN REPETITION RATE DIVIDER THAT DIVIDES BY A FRACTIONAL NUMBER

Robert L. Overstreet, Jr., Burlington, N.C., assignor to Bell Telephone Laboratories, Incorporated, New York, N.Y., a corporation of New York Filed Nov. 30, 1965, Ser. No. 510,522
Int. Cl. G06g *7/16;* H03k *23/24*
U.S. Cl. 235—150.3 4 Claims

ABSTRACT OF THE DISCLOSURE

The disclosed arrangements divide a pulse train repetition rate by a fractional number that does not include one-half. The reptition rate is sequentially multiplied and divided with either operation being performed first. Multiplication is by a whole number while division is performed in two stages comprising division by a fractional number that includes the fraction one-half and then division by two.

This invention relates to pulse train repetition rate dividers and in particular to dividers that divide by fractional numbers.

Pulse train repetition rate dividers produce output pulses at rates related to those of input pulses. The prior art discloses many dividers that divide by whole numbers, that is dividers that produce an output pulse each time a predetermined whole number of input pulses occur. Dividers are sometimes required, however, to divide by fractional numbers. In other words, there are occasions when an output pulse is required each time a fractional number of input pulses occur. Although U.S. Patent 3,189,832 issued to C. W. Pugh on June 15, 1965 discloses a divider that divides by fractional numbers that include one-half (such as 3½), the prior art appears deficient with respect to fractional number dividers.

An object of the invention is to divide the repetition rate of a pulse train by a fractional number.

A further object is to divide the repetition rate of a pulse train by a fractional number that does not include the fraction one-half.

The invention achieves these and other objects by sequentially multiplying and dividing the repetition rate of a pulse train, where either operation may be performed first. In accordance with the invention, multiplication is by a whole number while division is performed in two stages comprising division by a fractional number that includes the fraction one-half and division by two. The over-all function is one of division where the divisor is a fractional number that does not include the fraction one-half.

Other objects and features of the invention will become apparent from a study of the following detailed description of two illustrative embodiments.

Figure 1:
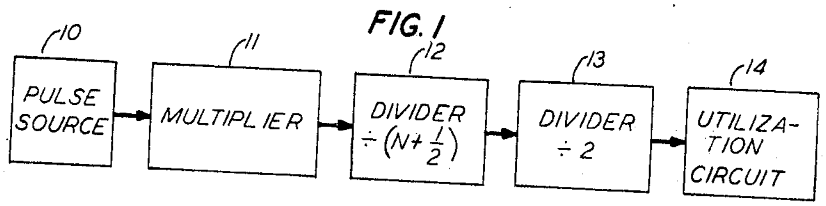
FIGS. 1 and 2 are block diagrams of two embodiments of the invention.

The embodiment of the invention shown in FIG 1 divides the repetition rate of the output of a pulse source 10. Source 10 produces a symmetrical output, that is its pulse durations are equal to the intervals between pulses. In accordance with the invention, the repetition rate of the output of source 10 is increased in a repetition rate multiplier 11. The higher repetition rate output produced by multiplier 11 is applied to a divider 12 which divides by $(N+½)$ where N is a whole number. The output of divider 12 is applied to a divide-by-two divider 13 whose output is, in turn, applied to a utilization circuit 14.

Figure 2:
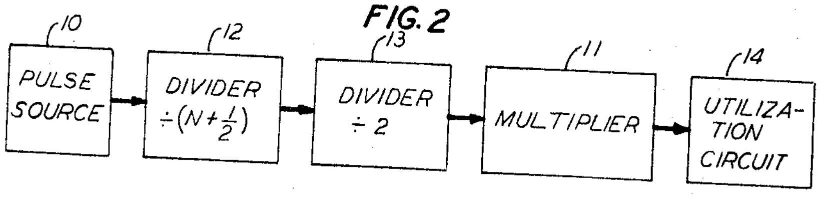

Since the embodiment of FIG. 2 is very similar to that of FIG. 1, FIG. 2 is discussed briefly before considering FIG. 1 in greater detail.

The elements of FIG. 2 have been identified by the same numerals as the elements of FIG. 1 because of identity of the elements. The only difference between the two block diagrams is that multiplier 11 follows divider 13 of FIG. 2 while it precedes divider 12 of FIG. 1. In some applications the embodiment of FIG. 1 is preferable while in others the embodiment of FIG. 2 is preferable.

Figure 3:
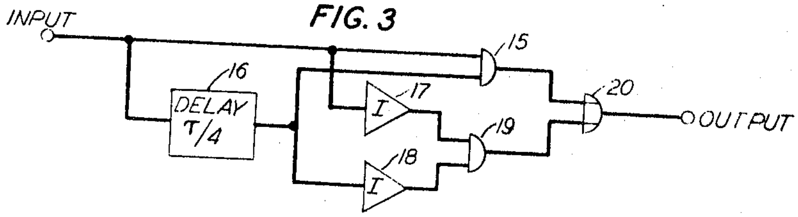
FIGS. 3, 4, 5 and 6 are block diagrams of a repetition rate doubler, a pair of repetition rate dividers and a repetition rate tripler, respectively, that may be used in embodiments of the invention.

Multiplier 11 of FIGS. 1 and 2 may comprise a serially connected plurality of repetition rate doublers. A doubler that may be used for this purpose is shown in FIG. 3. The input to this doubler is connected to an AND gate 15, a delay circuit 16 and an inverter 17. Delay circuit 16 provides a delay of one-quarter of the period of the input pulses to the doubler. The output of delay circuit 16 is applied to AND gate 15 and an inverter 18. Inverters 17 and 18 have their outputs applied to an AND gate 19. The outputs of AND gates 15 and 19 are, in turn, applied to an OR gate 20. AND gate 15, and consequently OR gate 20, produces an output pulse during the last half of an input pulse. AND gate 19, and consequently OR gate 20, produces an output pulse during the last half of the time interval between input pulses. A symmetrical output having twice the repetition rate of the input is thereby produced.

The repetition rate of the output of the doubler of FIG. 3 may be doubled by applying it to a second doubler. (In this case it should be noted that delay circuit 16 of the second doubler provides one-half of the delay of the delay circuit 16 of the first doubler). This process may be repeated to produce the desired multiplication. The original repetition rate is thereby multiplied by a factors $2^P$ where P equals the number of doublers.

Figure 4:
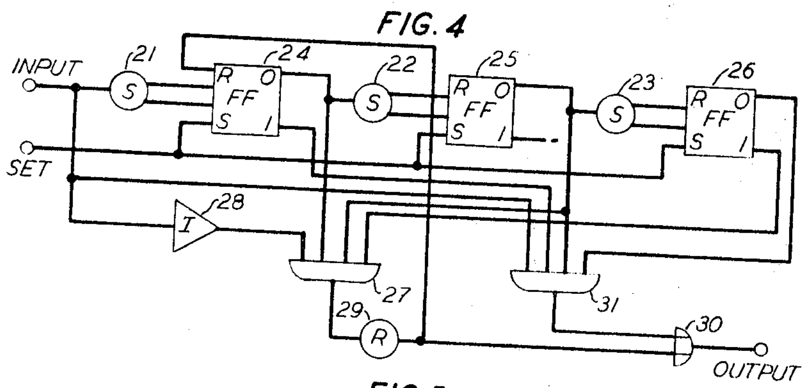

FIG. 4 discloses an $(N+½)$ divider from the Pugh patent. Briefly, this divider includes a conventional three stage counter comprising three steering circuits 21, 22 and 23 and three flip-flop circuits 24, 25 and 26. A circuit comprising an AND gate 27, and inverter 28 and a pulse regenerator 29 is connected to the input and the output circuits of the counter so that regenerator 29 produces an output pulse at one-half of a pulse period of the input pulse train after the counter registers a predetermined count. This pulse is applied to the counter for setting the counter to register a second count which is $(2N+1)$ less than the predetermined count. The pulse is also applied to an OR gate 30, which passes it to an output terminal.

A second AND gate 31 is connected to both the input and the output circuits of the counter to produce an output pulse when the counter registers a third count which equals the second count plus $(N+1)$. This output pulse is also applied to OR gate 30, which passes it to the output terminal.

Further analysis of the divider of FIG. 4 (see the Pugh patent for details) shows that N equals three so that the divider divides by 3½. Other dividing factors are achievable in accordance with the teachings of the Pugh patent.

Figure 5:
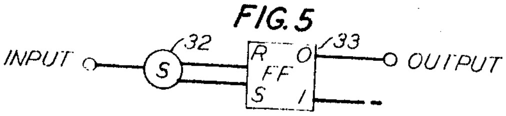

FIG. 5 discloses a one-stage counter which may be used as divider 13 in FIGS. 1 and 2. It comprises a steering circuit 32 and a flip-flop circuit 33. One output pulse is produced for each pair of input pulses. The operation of this circuit is well known in the art.

For purposes of demonstration, assume the circuits of FIGS. 3, 4 and 5 are used in the embodiments of FIGS.

1 and 2 and that it is desired to divide by 1¾. For either FIG. 1 or 2, this results in the following expression:

$$\frac{(N+\frac{1}{2})2}{2^P}=1\frac{3}{4}$$

The values of $P=2$ and $N=3$ satisfy this equation. The $(N+\frac{1}{2})$ divider shown in FIG. 4 may therefore be used while two doublers, each of which takes the form of that shown in FIG. 3, may be connected in tandem for the multiplier.

Figure 6:
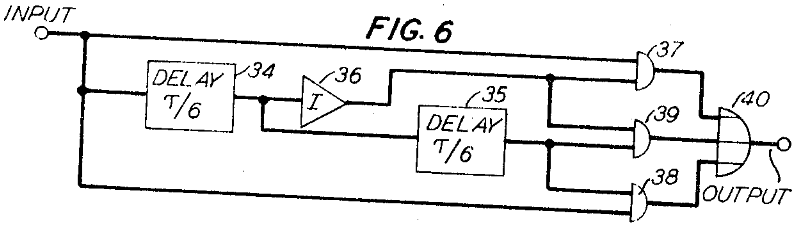

The above discussion considered multiplier 11 to comprise one or more repetition rate doublers. This multiplier may multiply by other factors as well. It may, for example, comprise one or more repetition rate triplers. One such tripler is shown in FIG. 6. The configuration and operation of this tripler are very similar to the doubler of FIG. 3.

The tripler of FIG. 6 comprises a pair of delay circuits 34 and 35, an inverter 36, three AND gates 37, 38 and 39 and an OR gate 40. AND gate 37 receives the input pulses and an inverted form of the input pulses delayed by one-sixth of their period. It therefore produces an output pulse during the first one-third of each input pulse. AND gate 38 receives the input pulses and the input pulses delayed by one-third of their period. This AND gate therefore produces an output pulse during the last third of each input pulse. AND gate 39 receives the inverted input pulses delayed by one-sixth of their period and the input pulses delayed by one-third of their period. This AND gate produces an output pulse during the middle one-third of the interval between the input pulses. The output from OR gate 40 is therefore of a symmetrical nature and has a repetition rate three times that of the input pulse train.

The output of the tripler of FIG. 6 may be tripled again by applying it to a second tripler. (In this case the delay provided by the delay circuits in the second tripler should be one-third of that provided by the delay circuit in the first tripler.) Still more triplers may be connected in series to produce a desired multiplication. The multiplication provided by such an arrangement is $3^P$ where P equals the number of triplers connected in series.

In view of the above discussion with respect to the use of doublers and triplers in multiplier 11, it is believed apparent that still other multipliers may be used.

Although the invention has been disclosed with respect to two embodiments, various other embodiments may be devised without departing from the spirit and scope of the invention.

What is claimed is:

1. A pulse train repetition rate divider comprising a repetition rate multiplier, first means to produce an output having a repetition rate equal to the repetition rate of an input divided by $(N+\frac{1}{2})$ where N is a whole number, a divide-by-two circuit connected to the output of said $(N+\frac{1}{2})$ divider, an input circuit, an output circuit, and second means connecting said multiplier and the combination of said first means and said divide-by-two circuit in series between said input and output circuits.

2. A divider in accordance with claim 1 in which said multiplier comprises a plurality of repetition rate multipliers connected in series.

3. A divider in accordance with claim 1 in which said multiplier precedes said combination of said first means and said divide-by-two circuit.

4. A divider in accordance with claim 1 in which said combination of said first means and said divide-by-two circuit precedes said multiplier.

References Cited

UNITED STATES PATENTS

| | | | |
|---|---|---|---|
| 2,892,933 | 6/1959 | Shaw | 235—150.3 XR |
| 3,189,832 | 6/1965 | Pugh | 328—42 |
| 3,230,353 | 1/1966 | Greene et al. | 235—150.3 |
| 3,283,254 | 11/1966 | Haynie | 307—220 XR |
| 3,384,827 | 5/1968 | Noordanus et al. | 328—42 |

MARTIN P. HARTMAN, *Primary Examiner.*

U.S. Cl. X.R.

307—220; 328—39.